United States Patent [19]
Coley et al.

[11] 3,959,693
[45] May 25, 1976

[54] GROUND FAULT INTERRUPTER APPARATUS WITH MEANS PROTECTING AGAINST A GROUNDED NEUTRAL CONDITION

[75] Inventors: Kenneth R. Coley, Fairfield; John J. Misencik, Shelton, both of Conn.

[73] Assignee: Westinghouse Electric Corporation, Pittsburgh, Pa.

[22] Filed: June 11, 1973

[21] Appl. No.: 368,915

Related U.S. Application Data
[63] Continuation of Ser. No. 218,771, Jan. 18, 1972.

[52] U.S. Cl. ............................. 317/18 D; 317/27 R
[51] Int. Cl.² ......................................... H02H 3/16
[58] Field of Search ................ 317/18 D, 27 R, 106

[56] References Cited
UNITED STATES PATENTS

| | | | |
|---|---|---|---|
| 2,063,307 | 12/1936 | Gurtler | 250/36 |
| 3,506,906 | 4/1970 | Nestor | 317/18 D |
| 3,611,035 | 10/1971 | Douglas | 317/18 D |
| 3,728,580 | 4/1973 | Moarot | 317/18 D |

FOREIGN PATENTS OR APPLICATIONS
1,141,367   12/1962   Germany ......................... 317/18 D

*Primary Examiner*—J. D. Miller
*Assistant Examiner*—Patrick R. Salce
*Attorney, Agent, or Firm*—G. H. Telfer

[57] ABSTRACT

Ground fault interrupter apparatus of the differential transformer type is provided with an additional output transformer, the primary of which is connected between a line conductor and the neutral conductor of an A.C. system with a current limiting resistor adjacent the primary winding. The secondary of the output transformer is the neutral conductor. THe saturation properties of the core of the output transformer are such that during each half cycle a voltage pulse is induced in the secondary. The voltage pulse is of no consequence in the system during normal conditions but if a grounded neutral condition exists a current is produced in the neutral conductor unbalancing the differential transformer and interrupting operation.

9 Claims, 4 Drawing Figures

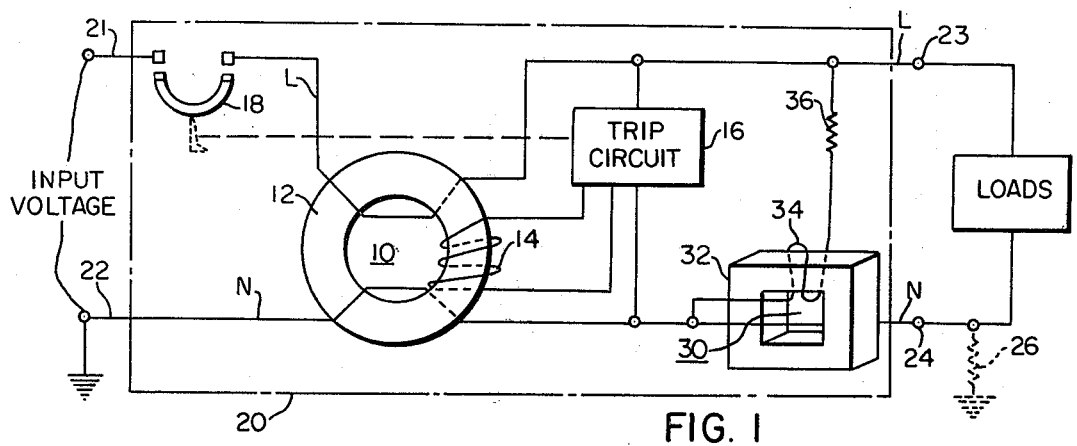
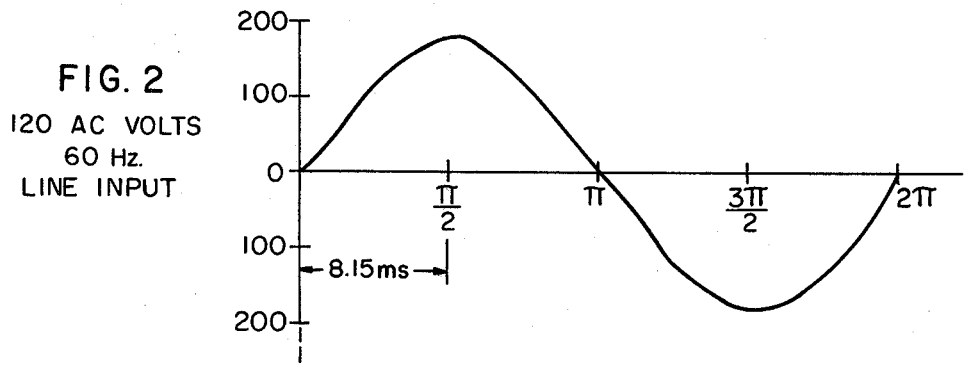
FIG. 2
120 AC VOLTS
60 Hz.
LINE INPUT
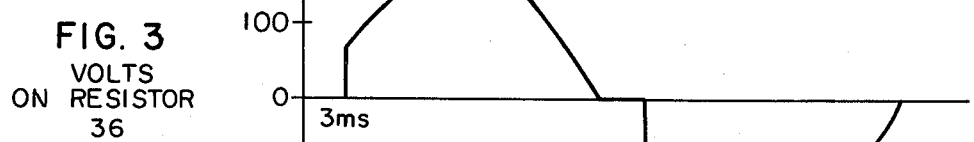
FIG. 3
VOLTS
ON RESISTOR
36
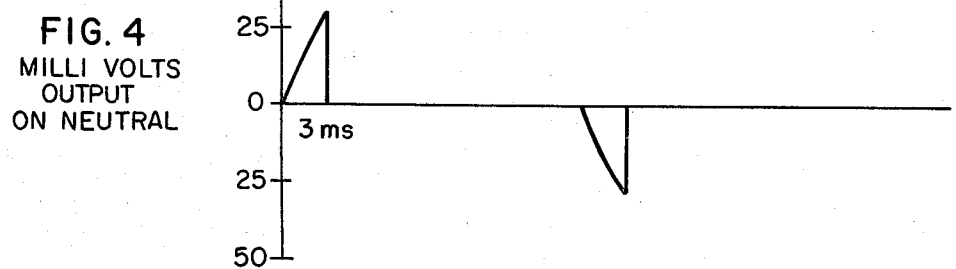
FIG. 4
MILLI VOLTS
OUTPUT
ON NEUTRAL

GROUND FAULT INTERRUPTER APPARATUS WITH MEANS PROTECTING AGAINST A GROUNDED NEUTRAL CONDITION

This is a continuation of application Ser. No. 218,771, filed Jan. 18, 1972.

BACKGROUND OF THE INVENTION

1. Field of the Invention

This invention relates to ground fault interrupter apparatus of the differential transformer type.

2. Description of the Prior Art

The basic condition for which known types of ground fault interrupters of the differential transformer type are intended to be effective is that in which there is a ground fault between the hot or line conductor and ground. A ground fault between the neutral conductor of a multi-wire A.C. system on the load side of the differential transformer and ground does not itself present a safety hazard of the type for which protection is required. Such a grounded neutral condition has the effect, however, of rendering the apparatus inoperative, particularly in the absence of a load on the circuit. When a leakage current to ground occurs on the load side of a neutral conductor that conductor is effectively shorted since it is intentionally grounded on the input side. By transformer action, the other primary winding, the hot or line conductor, will then have essentially no potential difference across it and the device would be incapable of generating sufficient power to produce a sensing current on the sensing winding sufficient to open the line circuit in the event of a ground fault on that line. In the event of a ground on the line conductor, there is a path back to the source through the grounded neutral conductor, reducing sensitivity of the unit.

Means have been proposed to avoid the adverse effects of the grounded neutral condition. For example, copending application Ser. No. 158,337, filed June 30, 1971, now refiled as continuation application Ser. No. 368,915, June 11, 1973, by K. R. Coley, J. J. Misencik and J. R. Reeves and assigned to the assignee of the present invention, (both of which applications are now abandoned) relates to a grounded neutral detection scheme using capacitive means connected between the neutral conductor and the line conductor. Upon occurrence of a grounded neutral, the capacitive means charges resulting in an unbalanced condition appearing on the neutral and line conductors which can be sufficient to cause tripping. This effect may be used with an additional magnetic core on the input side of the neutral conductor in order to limit current therein and permit use of a smaller capacitor. Alternatively, a magnetic core around the neutral conductor on the input side can be used to provide an effective impedance that avoids the problems of the grounded neutral condition even in the absence of the above mentioned capacitive means.

The foregoing techniques have considerable capability and effectiveness of performance. At the time of that invention, it was considered attractive to employ the disclosed means as providing an improvement in size and cost over other then known techniques such as that of U.S. Pat. No. 3,473,091, discussed below. However, development of the invention of the copending application left remaining a desire to minimize further the size and cost of the elements required for protecting against the grounded neutral condition.

The approach of the above-mentioned U.S. Pat. No. 3,473,091 is to place an impedance in the neutral conductor to keep substantial potential across it even in the event of a low impedance short to ground. In preferred forms shown in that patent, an auxiliary transformer is used whose primary is the line conductor wound in the same manner as in the differential transformer and whose secondary winding is the neutral conductor counterwound to produce reverse polarity from the neutral conductor of the differential transformer. This arrangement of reverse polarity transformer windings is said to make it appear that a high impedance exists in the neutral conductor regardless of any shorted condition on the load side. Alternatively, the primary conductor of the output transformer may be a winding connected between the line and neutral conductors, but with similar effect. A further example of prior art using a transformer induced voltage in the neutral conductor to cause a current imbalance when the neutral conductor is grounded is U.S. Pat. No. 3,506,906.

The use of an auxiliary transformer that is intended to provide continuous transformer action to present a high impedance in the neutral conductor requires an undesirable addition of bulk and corresponding cost that is very important because of the interest in providing ground fault interrupter apparatus in compact form in order to permit their use in association with conventional circuit breakers.

U.S. Pat. No. 3,611,035 discloses a way to protect against the grounded neutral condition in which a high frequency tickler voltage is induced into the neutral conductor through an output transformer. The disclosed system requires a considerable number of components including a semiconductor switch that presents temperature sensitive characteristics and a susceptibility to voltage surges. Thus, while output transformer core size reduction over previous proposals may be achievable, the cost, size and reliability of the ancillary components is considered undesirable.

It was in an effort to provide protection against the grounded neutral condition while minimizing the size and cost of all the elements required, and while maintaining high reliability, that the present invention came about.

SUMMARY OF THE INVENTION

Ground fault interrupter apparatus of the differential transformer type is, in accordance with this invention, provided with an additional output transformer, i.e., a transformer located on the output side of the differential transformer. The primary of the output transformer is connected between one of the line conductors and the neutral conductor of a single-phase or polyphase A.C. distribution system with a current limiting resistor adjacent the primary winding. The secondary of the output transformer is the neutral conductor. The core of the output transformer is such that it saturates in a time that is short compared with the A.C. half cycle so during each half cycle a brief voltage pulse is induced in the secondary. The voltage pulse is of no consequence in the system during normal conditions but if a grounded neutral condition exists, a current is produced in the neutral conductor unbalancing the differential transformer and interrupting operation.

In contrast to the arrangement of the above-mentioned U.S. Pats. Nos. 3,473,091 and 3,506,906, the present invention intentionally provides an output transformer whose core saturates each half cycle of operation resulting in a low impedance, rather than a high impedance, in the neutral conductor. A small and economical output transformer can be used in the present invention. Additionally, low power losses occur and there is no need to take steps to avoid problems of A.C. hum resulting from the output transformer as may occur in the apparatus of U.S. Pats. Nos. 3,473,091 and 3,506,906. Furthermore, the present invention provides improvements in size and cost as compared with the arrangements of the above-mentioned copending application.

As compared with the apparatus disclosed in U.S. Pat. No. 3,611,035, the present invention requires fewer components, none of which are highly temperature sensitive or susceptible to damage due to voltage surges.

THE DRAWING

FIG. 1 is a schematic diagram of an embodiment of the present invention; and

FIGS. 2 to 4 are waveforms illustrating the operation of the present invention.

PREFERRED EMBODIMENTS

Referring to FIG. 1, ground fault interrupter apparatus of the differential transformer type is shown wherein a differential transformer 10 having a toroidal core 12 is provided with conductors, including a line conductor L and a neutral conductor N, extending through it as primary windings, each preferably of a single turn although multiple turn windings may be used if desired. The illustration of the conductors is merely schematic; in accordance with a preferred form, the primary conductors L and N are in coaxial arrangement as they pass through the transformer core 12, as disclosed in copending application Ser. No. 158,338, filed June 30, 1971, by J. R. Reeves et al and assigned to the present assignee, now U.S. Pat. No. 3,736,468 issued May 29, 1973.

A sensing winding 14, usually of a plurality of turns, is also provided on the core 12 for sensing an imbalance in the conduction current levels of the primary conductors. Such an imbalance produces a sensed current in winding 14 which, if of sufficient magnitude and occurring for a sufficient time, actuates a trip circuit 16 in order to actuate the circuit breaker mechanism 18 on the conductors on the input side of the differential transformer 10. The trip circuit 16 may be of various known types including, for example, those disclosed in above-mentioned copending application Ser. No. 158,338. All the elements within box 20 may be combined to facilitate their use as shown in copending application Ser. No. 219,710, filed Jan. 21, 1972, by E. W. Frantti and F. L. Gelzheiser and assigned to the present assignee now U.S. Pat. No. 3,745,414, issued July 10, 1973.

The circuit illustrated is merely exemplary. The invention may also be embodied in a circuit having more than two conductors, such as a single phase, three wire system or a three phase, four wire system. Terminals 21 and 22 on the input side are for connection to a power source or supply. One or more loads to be energized by the system may be connected to terminals 23 and 24 on the output side.

If a ground fault occurs on the line conductor L in the load circuit, without a grounded neutral condition, the operation of the apparatus is essentially straight-forward in accordance with past practice. The present invention comes into play if a leakage path to ground occurs from the neutral conductor on the load side of the transformer, as indicated by the path 26 to ground, which may have some impedance. Under such circumstances, the apparatus so far described would not be sensitive to line conductor grounds and would present an unknown hazard to those relying on the protection of the apparatus. The problems resulting from a grounded neutral condition are particularly serious when a load is not connected in the system.

In accordance with this invention, an additional output transformer 30 of the current sensing type is provided on the load side of the sensor or differential transformer 10. The output transformer has a core 32 on which is a primary winding 34 that is a conductor connected between the line and neutral conductors L and N of the system. For purposes of this invention, it is preferable to minimize the losses in the primary winding 34 of the output transformer and permit use of a small cross-section conductor by interposing a current limiting means, such as a substantial resistance 36, in series with the primary on the side toward line conductor L. In most applications, a resistance of 10,000 to 35,000 ohms is suitable. The secondary of the output transformer is the neutral conductor, preferably in a single turn. It is preferred that the ratio of primary to secondary turns be high, such as at least 1000 to 1, because such a higher ratio of turns permits use of a smaller core. A single turn secondary is most convenient for fabrication.

In operation, in the absence of any load on the output terminals and also in the absence of any ground on the neutral conductor, a current path with minor losses is completed through the line conductor L, the primary winding 34 and the neutral conductor N. The polarities of the windings of the output transformer 30 are not significant and the benefits of this invention may be provided whether or not they are the same as the primary windings of transformer 10.

The effect of the present invention is to make the apparatus have the capability of applying an open circuit potential of limited energy due to the saturating sensitivity of the material of core 32. A pulse is produced which is synchronized to the A.C. input so that upon the accidental grounding or shorting of the neutral to a mechanical ground on the load side of the system a closed loop is produced and an imbalancing current flows in the differential transformer. The circuit does not respond to the requirements of the load until the accidental grounding is removed. If, for example, a person was connected to the output hot leg L through a leakage path, while a grounded neutral condition exists and a load circuit is then closed, the system will be shut down within the required period of time for safety due to the automatic trip-out feature.

Considering further the operation of the unit in the grounded neutral condition, the fact that the primary 34 of the output transformer is connected through a current limiting resistor 36 means that upon each half cycle the current flow in the primary 34 is transformed into the secondary winding N. At the beginning of the half cycle, the transformer works along the magnetic properties of the core material until a point is reached at which the impressed voltage produces saturation, which in accordance with this invention is reached during each normal half cycle. At that time the transformer output capability decreases to zero, that is, no further transformer action occurs. This circumstance results in a pulse of voltage of limited time duration into the secondary winding during a portion of the half cycle until saturation is reached.

By way of further example, an operative embodiment of the invention that has been successfully used is one designed for a two wire system of 60 Hertz, 120 volts with a differential transformer 10 and trip circuit 16 substantially in accordance with the above-mentioned description contained in the copending application Ser. No. 158,338. The additional output transformer 30 in accordance with this invention had a laminated core 32 of 17,000 gauss silicon steel (Type 124 D.U., Magnetic Metals Inc.), and a rectangular face with outer dimensions of about 1 in. by 0.4 in. and a thickness of about 0.3 inch with a window opening of about 0.5 in. by 0.2 in. The primary winding 34 on the output transformer was current limited by an 18,000 ohms, 1 watt resistor, before the primary winding of 3000 turns of number 46 wire. The secondary winding of the output transformer was merely the neutral insulated wire which also passes through the eye of the sensor transformer core 12. During each half cycle of the A.C. wave, a pulse of 32 millivolts was produced for a duration of 3 milliseconds which is of sufficient magnitude for detecting the grounded neutral condition within the range required by Underwriters Laboratories standards. The pulse duration is made appropriate for the minimum time of response for the trip circuit. A general condition at which operation is to occur is that the transformer core 32 must saturate at a magnitude of voltage on the secondary winding N that is capable of resulting in a current in that winding capable of unbalancing the sensor and tripping in the grounded neutral condition. Small, rapidly saturating transformers can be readily formed to meet these required conditions. In the proposals of U.S. Pat. Nos. 3,473,091 and 3,506,906 saturation of the output transformer would be contrary to its intended operation.

The use of an 18,000 ohm resistor 36 (or one of similar value, e.g. 15,000 to 20,000 ohms) is particularly favorable because the resistor can then perform a dual function in a 120 volt, 60 Hertz, system. Besides acting as a current limiting resistor in series with winding 34, it can also be connected as a current limiting resistor in a test switch circuit (or supervisory circuit in current U.L. terminology). For the latter purpose, a point between resistor 36 and winding 34 is connected in series with a test switch back to the neutral conductor on the input side of transformer 10. When the test switch is closed, it provides a current imbalance that should cause interruption. Such test switch circuits are known. A resistor of 18,000 ohms is generally used in such test switch circuits, between conductor L at the load to the input neutral, because it produces from 120 v. A.C., the current level to which the device is required to be sensitive.

Further understanding of the nature and operation of the present invention may be had by referring to the waveforms of FIGS. 2 to 4 which illustrate in FIG. 2 a normal sinusoidal input waveform for a 120 A.C. volt, 60 Hertz, system. The waveform of FIG. 3 shows the voltage drop across resistor 36 which is the input waveform as affected by the saturation properties of transformer 30. The waveform of FIG. 4 shows the voltage pulses produced on the neutral conductor.

Advantages in size and cost of elements are a major improvement of this invention. Furthermore, there are advantages of having low losses in the output transformer 30 so that regulation of the output load currents is not subject to restrictions due to the losses of the output transformer. It has been found possible to incorporate the entire apparatus of this invention in a ground fault interrupter in an enclosure like that of a standard ½ inch circuit breaker. This permits a combination in a 1 inch package of a ½ inch breaker and a ½ inch ground fault interrupter.

This invention provides protection against the grounded neutral condition as defined under Underwriters Laboratories and CSA specifications while still permitting considerable minimization of the size of the unit.

We claim:

1. Ground fault interrupter apparatus comprising: a differential current transformer including a magnetic core, a plurality of primary windings on said core, each being one of the line and neutral conductors of an A.C. electrical distribution system, a secondary sensing winding on said core for sensing current unbalance between said primary windings; means responsive to a predetermined sensing signal to open said line conductors; an additional transformer comprising a second magnetic core, a primary winding on said second magnetic core comprising a conductor connected between said line and neutral conductors, a secondary winding on said additional transformer comprising said neutral conductor of said power system, said core being saturated during a part of each half cycle of an A.C. wave presented by an external power system on said line and neutral conductors.

2. The subject matter of claim 1 wherein: said conductor connected between said line and neutral conductors has therein a current limiting resistor on the line side of said primary winding.

3. The subject matter of claim 2 wherein: said conductor connected between said line and neutral conductors comprises only said primary winding and said current limiting resistor connected therein.

4. The subject matter of claim 3 wherein: said resistor has a value of from about 15,000 to about 20,000 ohms.

5. The subject matter of claim 1 wherein: said additional transformer has a turns ratio of at least 1000:1 between said primary and secondary windings.

6. In ground fault interrupter apparatus for connection in an A.C. electrical distribution system having a neutral conductor and at least one line conductor between a supply and a load, said neutral conductor being grounded at said supply, the combination comprising: means for monitoring currents in said line and neutral conductors and producing a signal when said currents are unbalanced, and means for inducing a voltage pulse on said neutral conductor during only a portion of each half cycle of the alternating waveform applied from said supply, said voltage pulses causing a current unbalance to be sensed by said means for monitoring currents when said neutral is grounded on the load side thereof; said means for inducing a voltage pulse comprises an additional transformer having a magnetic core, a primary winding on said magnetic core comprising at least 1000 turns connected between said line and neutral conductors with a current limiting resistor on the line side of said primary winding, and a secondary winding comprising a portion of said neutral conductor extending through said core in a signal turn, said core being saturated during each half cycle of said alternating waveform after said voltage pulse is induced on said neutral conductor.

7. The subject matter of claim 6 wherein: said primary winding and said current limiting resistor are the only components in a circuit branch directly connected between said line and neutral conductors.

8. A method of producing voltage pulses on the neutral conductor of an A.C. electrical distribution system for the purpose of preventing a ground fault circuit interrupter from becoming disabled by a current path to ground occurring from the neutral conductor on the load side of the ground fault circuit interrupter, comprising the steps of: providing a magnetic core with a first winding connected between line and neutral conductors of said system and a second winding comprising said neutral conductor; and saturating said core during each half cycle of the alternating voltage of the system for an interval that is a major portion of the duration of a half cycle, said saturating being effected by the alternating voltage between said line and neutral conductors applied to said first winding on said core so that voltage pulse is induced on said neutral conductor only during a small portion of the half cycle in which said core is not saturated.

9. The subject matter of claim 8 wherein: the providing of said magnetic core with a first winding includes having said first winding connected at one end directly to said neutral conductor at a point intermediate said core and the supply and at the other end to said line conductor through only a current limiting resistor.

* * * * *

UNITED STATES PATENT AND TRADEMARK OFFICE
CERTIFICATE OF CORRECTION

PATENT NO. : 3,959,693
DATED : May 25, 1976
INVENTOR(S) : Kenneth R. Coley et al.

It is certified that error appears in the above—identified patent and that said Letters Patent is hereby corrected as shown below:

Column 1, line 41, "368,915, June 11, 1973" should be -- 376,255, July 3, 1973 --.

Claim 6, line 21, (appearing at patent Col. 6, line 67), "signal" should be -- single --.

Claim 8, line 16, (appearing at patent Col. 8, line 6), before "voltage" should appear -- a --.

Signed and Sealed this

Ninth Day of March 1982

[SEAL]

*Attest:*

*Attesting Officer*

GERALD J. MOSSINGHOFF

*Commissioner of Patents and Trademarks*

REEXAMINATION CERTIFICATE (293rd)
United States Patent [19]
Coley et al.

[11] B1 3,959,693
[45] Certificate Issued  Jan. 1, 1985

[54] GROUND FAULT INTERRUPTER APPARATUS WITH MEANS PROTECTING AGAINST A GROUNDED NEUTRAL CONDITION

[75] Inventors: Kenneth R. Coley, Fairfield; John J. Misencik, Shelton, both of Conn.

[73] Assignee: Westinghouse Electric Corporation, Pittsburgh, Pa.

Reexamination Request:
No. 90/000,188, Apr. 8, 1982

Reexamination Certificate for:
Patent No.: 3,959,693
Issued: May 25, 1976
Appl. No.: 368,915
Filed: Jun. 11, 1973

Certificate of Correction issued Mar. 9, 1982.

Related U.S. Application Data
[63] Continuation of Ser. No. 218,771, Jan. 18, 1972.

[51] Int. Cl.³ .............................................. H02H 3/347
[52] U.S. Cl. ......................................... 361/45; 361/78
[58] Field of Search ............... 323/240, 249, 250, 251, 323/252, 253; 363/91; 328/32, 33; 307/8, 9; 336/155, 174; 361/44–46, 78

[56] References Cited
U.S. PATENT DOCUMENTS

| | | | |
|---|---|---|---|
| 2,063,307 | 12/1936 | Gurtler | 250/36 |
| 3,473,091 | 10/1969 | Morris et al. | 361/45 |
| 3,506,906 | 4/1970 | Nestor | 361/45 |
| 3,535,590 | 10/1970 | Mayer | 361/45 |
| 3,611,035 | 10/1971 | Douglas | 361/46 |
| 3,728,580 | 4/1973 | Moarot | 361/45 |

FOREIGN PATENT DOCUMENTS 1141367  12/1962  Fed. Rep. of Germany ........ 361/44

OTHER PUBLICATIONS

"Transformers for the Electric Power Industry" by Bean et al., McGraw-Hill Book Co., 1959, New York.
*SCR Handbook*, published by Maruzen (Japan), 1966, pp. 74–75.

*Primary Examiner*—Patrick R. Salce

[57] ABSTRACT

Ground fault interrupter apparatus of the differential transformer type is provided with an additional output transformer, the primary of which is connected between a line conductor and the neutral conductor of an A.C. system with a current limiting resistor adjacent the primary winding. The secondary of the output transformer is the neutral conductor. The saturation properties of the core of the output transformer are such that during each half cycle a voltage pulse is induced in the secondary. The voltage pulse is of no consequence in the system during normal conditions but if a grounded neutral condition exists a current is produced in the neutral conductor unbalancing the differential transformer and interrupting operation.

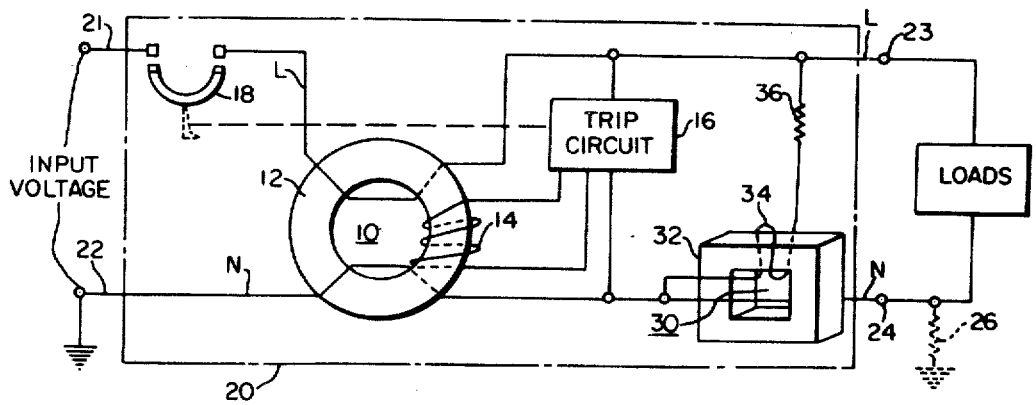

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-9 are cancelled.

* * * * *